May 30, 1939.  R. J. LOHR  2,159,974
MULTIPLE VEHICLE TOY
Filed July 8, 1937  2 Sheets-Sheet 2
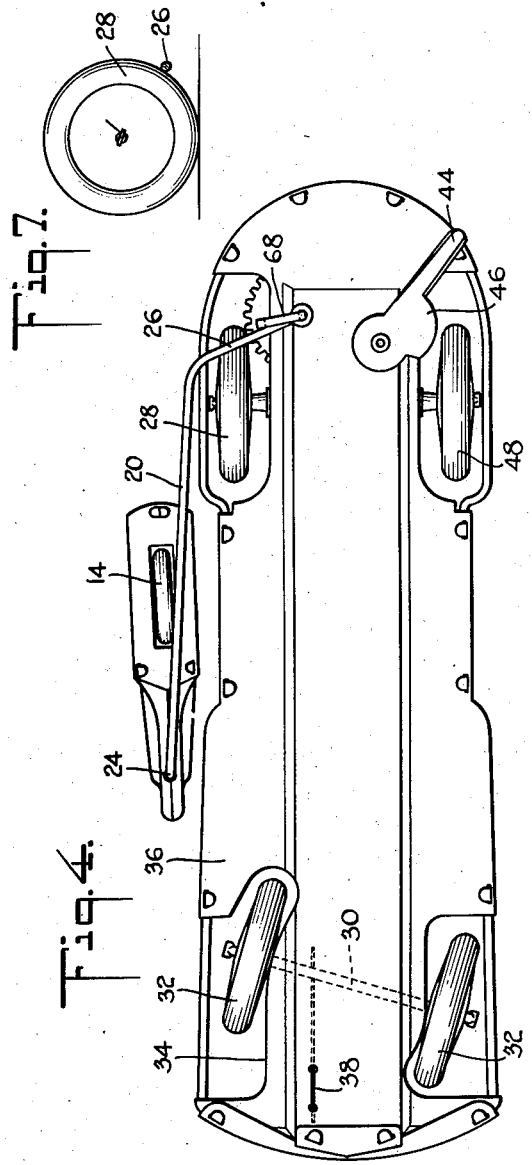
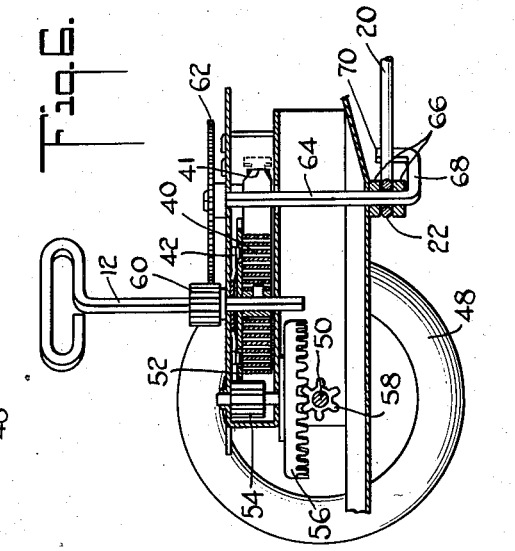
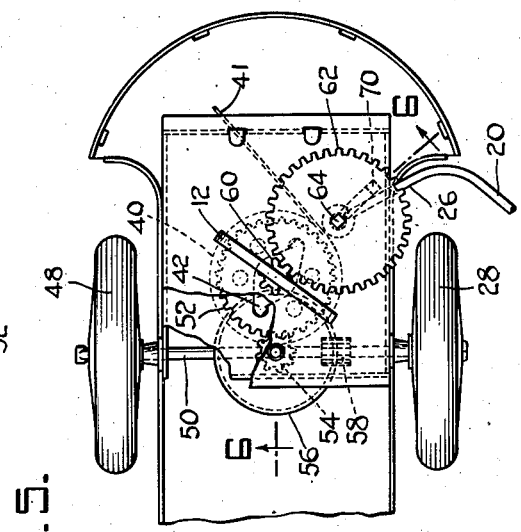
INVENTOR
Raymond John Lohr
BY
ATTORNEYS Patented May 30, 1939

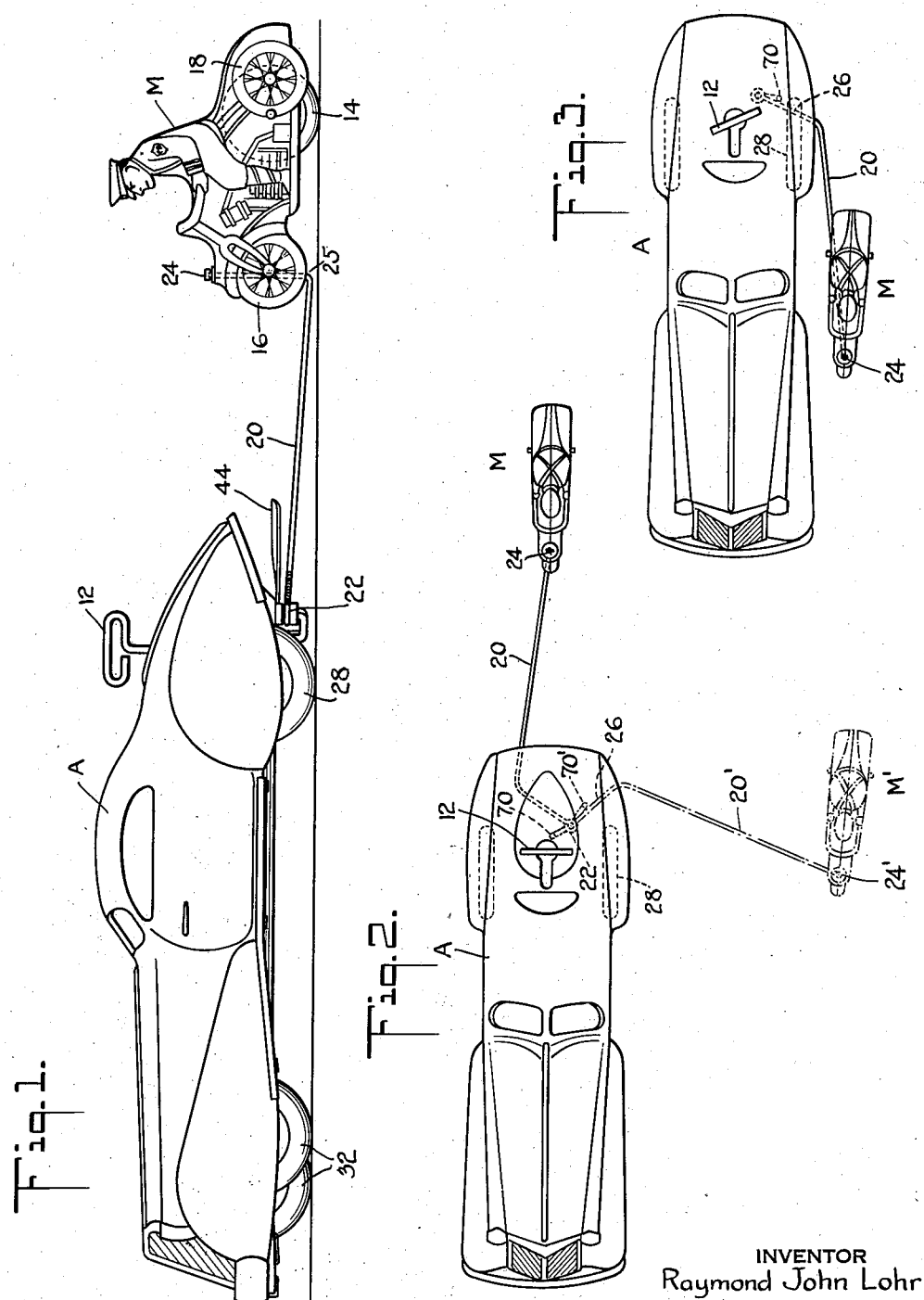

2,159,974

UNITED STATES PATENT OFFICE 2,159,974

MULTIPLE VEHICLE TOY

Raymond John Lohr, Erie, Pa., assignor to Louis Marx & Company, Inc., New York, N. Y., a corporation of New York Application July 8, 1937, Serial No. 152,504

23 Claims. (Cl. 46—202)

This invention relates to vehicle toys, and more particularly to a multiple vehicle toy in which a plurality of vehicles, while traveling along, have their relative position changed automatically by the toy mechanism.

The primary object of my invention resides in the provision of a vehicle toy comprising a plurality of vehicles which travel generally together, and the relative positions of which are determined by an arm, the position of said arm being so changed by the vehicle mechanism as the vehicles travel, as to change the relationship and spacing of the toys.

A more particular object resides in the provision of a toy comprising a pursued vehicle and a pursuing vehicle, the latter trailing the former and then gaining upon and simulatedly catching and stopping the pursued vehicle. It may come alongside the pursued vehicle when stopping the same. Preferably the first vehicle only is powered by a driving motor, and the second vehicle is pulled behind the first vehicle by an arm disposed inconspicuously near the floor. This arm is swung around by the driving mechanism from a position behind the first vehicle to a position sidewardly and then forwardly of the first vehicle, thus causing the pursuing vehicle to gain on and finally to come alongside the pursued vehicle.
A still more particular object is to simulate the pursuit and arrest of a speeding motorist by a motorcycle policeman, and to this end the first vehicle simulates an auto, while the second vehicle simulates a motorcycle policeman. The policeman pursues, gains upon, reaches and stops the speeding auto. Moreover, in accordance with detailed features and objects of the present invention, there is a suitable lost-motion connection between the driving motor and the arm connecting the vehicles, so that the motorcycle preliminarily trails the auto at a fixed distance directly therebehind as though clocking the speed of the auto. Thereafter the motorcycle gains upon and comes alongside the auto, as above described. A still further object of my invention is to bring the auto to a quick stop when the motorcycle policeman overtakes the auto as aforesaid, and in the particular form of the invention here illustrated, this object is fulfilled by so forming the connecting arm that it bears against and brakes one of the driving wheels of the auto at the desired time.

To the accomplishment of the foregoing and such other objects as will hereinafter appear, my invention consists in the vehicle toy elements and their relation one to the other as hereinafter are more particularly described in the specification and sought to be defined in the claims. The specification is accompanied by drawings in which:

Fig. 1 is a side elevation of a toy embodying features of my invention;

Fig. 2 is a plan view thereof, showing the initial and intermediate positions of the motorcycle relative to the auto;

Fig. 3 is a plan view showing the final position of the motorcycle relative to the auto;

Fig. 4 is an inverted plan view of the toy;

Fig. 5 is a plan view of the rear end of the auto, with the body removed to expose the working mechanism;

Fig. 6 is a section taken in elevation in the plane of the line 6—6 of Fig. 5; and Fig. 7 is explanatory of a detail of the invention.

Referring to the drawings and more particularly to Figs. 1, 2, and 3, the toy comprises a plurality of vehicles A and M, the vehicle A being a pursued vehicle, in this case an auto, and the vehicle M being a pursuing vehicle, in this case a motorcycle policeman. The toy initially runs with the motorcycle policeman trailing the auto, as is clearly shown in Figs. 1 and 2. Thereafter the motorcycle policeman gains on the auto and turns sidewardly therefrom, as shown by the broken-line position M' in Fig. 2. The motorcycle policeman then comes directly alongside the auto, as shown in Fig. 3, and the auto comes to a quick stop, thus simulating the clocking, pursuit, and arrest of a speeding motorist.

Considering the arrangement in somewhat greater detail, only one of the vehicles need be provided with a driving motor, and in this case the auto A is driven by a spring motor wound by key 12. The motorcycle M may, if desired, run on a single wheel 14, though it simulatedly is provided with front and rear wheels 16 and 18. The vehicles are connected together by an arm 20 the forward end of which is pivotally mounted on the auto at 22, and the rear end of which is pivotally mounted on the motorcycle, as by passing vertically through the simulated front wheel thereof, as at 24. The motorcycle is towed by the auto, and as long as the arm 20 remains in the rearward position shown in Figs. 1 and 2, the spacing between the motorcycle and auto and the relative positions thereof remain constant. Appropriate connections hereinafter described in greater detail, are provided between the driving motor of the auto and the arm 20, whereby the arm 20 is swung around from the rearward position shown in Figs. 1 and 2 to the sideward position shown in broken lines in Fig. 2, and then to the forward position of Fig. 3, at which time the motorcycle is in a sense being pushed, rather than pulled, by the auto.

The auto is brought to a stop in a very simple manner, the arm 20 being so shaped that a portion 26 thereof comes into direct rubbing or braking engagement with the rear wheel 28 of the auto when the arm reaches the position shown in Fig. 3.

This feature of the invention may be more clearly understood by reference to Figs. 4 and 7, definitely showing the manner in which the part 26 of arm 20 is brought into rubbing engagement with the wheel 26. Fig. 4 also shows the pivotal mounting of the front axle 30, whereby the front wheels 32 may be changed from a straight to the angular position shown, the positions of axle 30 being determined by notches on an edge 34 turned upwardly from bottom plate 36 of the toy auto, the axle being held in adjusted position by a hair-spring 38. This mechanism is conventional and requires no detailed description. It may be explained that the angular disposition of the front axle is convenient when running the toy in a room of ordinary size, thus permitting sufficient travel of the toy for it to go through the complete cycle of operation heretofore outlined.

The driving mechanism of the toy may be explained with reference to Figs. 5 and 6. The spring motor is of generally conventional type, it comprising a ribbon type main spring 40 the outer end of which is connected to the motor frame at 41, and which is wound by the vertical winding stem 12 previously referred to. Dog or ratchet mechanism 42 of any conventional type may be used to permit winding of the main spring without accompanying rotation of the rear wheels. In fact, during the winding operation the rear wheels are preferably locked by a stop lever 44 which has been omitted in Fig. 5 but which is clearly shown in Figs. 1 and 4. This lever includes a camming portion 46 which may be moved into breaking engagement with rear wheel 48. Both of the rear wheels 28 and 48 are secured to the rear axle 50.

The main driving gear 52 of the spring motor meshes with a pinion 54 which in turn is secured to and drives an inverted crown gear 56 the teeth of which mesh with a pinion 58 secured to the rear axle 50. In this way the main spring and the rear axle are interconnected by a suitable train of step-up gearing, thus providing a satisfactory long travel of the toy for a comparatively few rotations of the winding stem.

The arm 20 may, of course, be moved by separate motor mechanism, but for economy and convenience it is preferably moved by the same spring motor that is used to propel the vehicles. In the present case the mechanism is of simple character, it comprising a pinion 60 secured to winding stem 12 and meshing with a gear 62 secured at the upper end of a shaft 64. This shaft is preferably concentric with the pivotal mounting of the forward end of arm 20, and, as is best shown in Fig. 6, the end of arm 20 is curled to form an eye 22 which is received around shaft 64 and which is additionally retained in position or guided by washers 66. The arm 20 is not secured directly to shaft 64 but preferably is loosely oscillatable thereabout. The shaft 64 and arm 20 are preferably connected by a lost-motion connection, thus permitting nearly a full revolution of shaft 64 instead of only the half revolution through which arm 20 is swung, and this in turn affords an initial period during which the motorcycle trails the auto at uniform spacing.

In the present case the lost-motion connection is made by bending the lower end of shaft 64 sidewardly at 68 and then upwardly at 70 to form a member adapted to come against and push the rod 20 in the desired direction, this being clearly shown in the various figures of the drawings. It should be understood that when the motor is fully wound, the shaft 64 is turned through substantially more than half a revolution and the member 70 may be brought well around in counter-clockwise direction from arm 20, when viewed from above as in Fig. 2. In fact the position of the part 70 shown in Fig. 2, evidences some clearance between member 70 and arm 20, and this clearance or lost motion may obviously be increased to an amount greater than is shown in Fig. 2. The arm 20 simply trails in back of the auto because of the load of the motorcycle which it pulls along. As the two vehicles run along, the member 70 turns through its arc of lost motion until it finally reaches the arm 20, whereupon it begins to push the arm around, as shown by the successive positions in Figs. 2 and 3. Of course, the final position of arm 20 alongside the auto is determined by the bearing of part 26 of arm 20 directly against the rear wheel 28, as was previously described and as is clearly shown in Figs. 3, 4, and 7 of the drawings. The main spring at this time is attempting to drive the rear wheels, but it far more powerfully drives the member 70 against arm 20, thus wedging the arm forcibly against the wheel and bringing the auto to an abrupt stop as though the driver had just been signaled by the motorcycle policeman.

The single wheel 14 of the motorcycle M is near the rear end of the motorcycle, but the forward end is held in desired elevated position by rod 20. This is so, even though the forward end of the rod is loosely mounted, because the rear end of the rod has bearings in the motorcycle at both the top and bottom, that is, at the point 25, as well as at the point 24.

It is believed that the construction and operation as well as the many advantages of my improved vehicle toy, will be apparent from the foregoing detailed description thereof. It will also be understood that while the specific example of the toy here illustrated comprises an auto and motorcycle, the toy may simulate any plurality of vehicles, or any pursued and pursuing objects, and that changes in mechanism, as well as changes in simulation, may be made. For example, the auto may be brought to a stop by simply letting the motorcycle reach and bear against the side of the auto, instead of using a special brake as here shown. The spring may be an easily wound helical wire ring, instead of a ribbon spring, and in such case a greater gear reduction ratio to the vertical spindle which moves the arm may be desired. The motor may be arranged with horizontal shafts parallel to the rear axle of the auto, and the aforesaid vertical spindle may then be driven by a worm and gear reduction drive.

It will therefore be apparent that while I have shown and described my invention in a preferred form, many changes and modifications may be made in the structure disclosed, without departing from the spirit of the invention defined in the following claims.

I claim:

1. A vehicle toy comprising a first toy vehicle, means to move the same, a second toy vehicle disposed in the same horizontal plane as the first vehicle, an arm for supporting and moving the same, and motor driven means connected to one end of said arm to swing said arm at said end through an angle and to thereby change the angular position of said arm relative to the first vehicle in order to thereby change the relative positions of the vehicles.

2. A vehicle toy comprising a vehicle adapted to run on a suitable running surface, a motor for propelling the same, an arm pivotally mounted on said vehicle for movement about an upright pivot, said arm being moved by said motor in a generally horizontal plane to change the position of the arm relative to the vehicle, and an object independent of the vehicle mounted on said arm for movement in the same general horizontal plane and generally along the same running surface and along with but relative to the vehicle in response to movement of the arm.

3. A toy comprising a plurality of vehicles, a motor for propelling said vehicles, an arm extending to and so connected to both of the vehicles as to help determine the relative position of the two vehicles during their generally common movement, and means to vary the position of the arm in order to vary the relative position of the two vehicles while the vehicles are in motion under drive by the motor.

4. A vehicle toy comprising a plurality of vehicles connected together by a stiff arm, said vehicles being disposed at spaced points on said arm, a motor in one of said vehicles, and means operated by the motor for so changing the position of the arm on the motor bearing vehicle as to thereby change the relative position of the vehicles.

5. A self-contained vehicle toy assembly comprising a plurality of toy vehicles connected together by an arm the ends of which are pivotally related to the vehicles, a motor for propelling the vehicles, and motor-driven means connected to one end of the arm for changing the angular position of the arm and thereby changing the relative position of the vehicles, said means functioning automatically during propulsion of the vehicles.

6. A vehicle toy comprising a plurality of vehicles connected together by an arm pivotally related to the vehicles, a motor in one of said vehicles for driving the motor bearing vehicle along a suitable running surface, said second vehicle also being arranged to run on the same running surface, and means also operated by the motor for changing the position of the arm relative to the vehicles, thereby changing the relative position of the vehicles on the running surface.

7. A vehicle toy comprising first and second vehicles, the first vehicle having a motor and being propelled thereby, the second vehicle being motorless, an arm extending between the first and second vehicles and pivotally related thereto whereby the first vehicle pulls the second vehicle, and motor-driven means for swinging the arm forwardly from a pulling position to a pushing position.

8. A vehicle toy comprising first and second vehicles, the first vehicle having a motor and being propelled thereby, the second vehicle being motorless, an arm extending between the first and second vehicles and pivotally related thereto whereby the first vehicle pulls the second vehicle, and motor-driven means for so moving the arm relative to the first vehicle that the second vehicle initially runs behind the first vehicle and thereafter gains on the first vehicle and comes alongside thereof.

9. A vehicle toy comprising first and second vehicles, the first vehicle having a motor and being propelled thereby, the second vehicle being motorless, an arm extending between the first and second vehicles and pivotally related thereto whereby the first vehicle pulls the second vehicle, and means driven by the motor in the first vehicle for moving the arm from a position in back of the first vehicle to a position alongside the vehicle, whereby the second vehicle initially runs behind the first vehicle and thereafter gains on the first vehicle and moves sidewardly thereof.

10. A vehicle toy comprising first and second vehicles, the first vehicle having a motor and being propelled thereby, the second vehicle being motorless, an arm extending between the first and second vehicles and pivotally related thereto whereby the first vehicle pulls the second vehicle, and means driven by the motor in the first vehicle for moving the arm from a position in back of the first vehicle to a position alongside the vehicle, whereby the second vehicle initially runs behind the first vehicle and thereafter gains on the first vehicle and moves sidewardly thereof, the arm then being moved forwardly to still further advance the position of the second vehicle relative to the first vehicle, at which time the second vehicle is pushed rather than pulled by the arm.

11. A pursuit toy comprising a first vehicle, a motor in said vehicle for propelling the same, an arm pivotally mounted at the rear end of the vehicle, a simulated pursuing object pivotally mounted on the remote end of said arm, and means driven by the aforesaid motor for moving the arm from a position extending rearwardly from the first vehicle to a position extending sidewardly from and then forwardly alongside of the vehicle, whereby the pursuing object simulatedly trails and then overtakes and comes alongside the pursued vehicle.

12. An auto and motorcycle policeman toy comprising a first vehicle simulating an auto, an arm pivotally mounted at the rear end of the auto, a simulated motorcycle and policeman pivotally mounted on the remote end of said arm, motor means for driving said auto and motorcycle policeman, and means for moving the arm from a position extending rearwardly from the auto to a position extending forwardly alongside of the auto, whereby the motorcycle policeman simulatedly trails and then overtakes and comes alongside the auto.

13. A vehicle toy comprising a vehicle, a motor in said vehicle for propelling the same, an arm pivotally mounted at the rear end of the vehicle, a simulated pursuing object pivotally mounted on the remote end of said arm, whereby said pursuing object is pulled by the vehicle, and motor-driven means for moving the arm from a position extending rearwardly from the vehicle to a position extending sidewardly from and then forwardly alongside of the vehicle, whereby the pursuing object simulatedly trails and then overtakes and comes alongside the vehicle.

14. An auto and motorcycle policeman toy comprising a first vehicle simulating an auto, a spring motor in said auto geared to the wheels of the auto for propelling the same, an arm pivotally mounted at the rear end of the auto, a simulated motorcycle and policeman pivotally mounted on the remote end of said arm, whereby said motorcycle policeman is pulled by the auto, and means driven by the aforesaid spring motor for moving the arm from a position extending rearwardly from the auto to a position extending sidewardly from and then forwardly alongside of the auto, whereby the motorcycle policeman simulatedly trails and then overtakes and comes alongside the auto.

15. A vehicle toy comprising a vehicle, a spring motor in said vehicle geared to the wheels of the vehicle for propelling the same, an arm pivotally mounted at the rear end of the vehicle, a simulated pursuing object pivotally mounted on the remote end of said arm, whereby said object is moved by the vehicle, and means driven by the aforesaid spring motor for moving the arm from a position extending rearwardly from the vehicle to a position extending sidewardly from and then forwardly alongside of the vehicle, whereby the object simulatedly trails and then overtakes and comes alongside the vehicle, said means including speed reducing gearing connecting the motor to a verical shaft which drives the arm.

16. An auto and motorcycle policeman toy comprising a first vehicle simulating an auto, a motor in said auto for propelling the same, an arm pivotally mounted at the rear end of the auto, a simulated motorcycle and policeman pivotally mounted on the remote end of said arm, whereby said motorcycle policeman is pulled by the auto, and motor-driven means for moving the arm from a position extending rearwardly from the auto to a position extending forwardly alongside of the auto, whereby the motorcycle policeman simulatedly trails and then overtakes and comes alongside the auto, said means becoming effective only after the toy has run for a time, thus providing a period during which the motorcycle policeman trails the auto at a uniform spaced distance therefrom as though clocking the speed of the auto.

17. An auto and motorcycle policeman toy comprising a first vehicle simulating an auto, a spring motor in said auto geared to the wheels of the auto for propelling the same, an arm pivotally mounted at the rear end of the auto, a simulated motorcycle and policeman pivotally mounted on the remote end of said arm, whereby said motorcycle policeman is pulled by the auto, and means driven by the aforesaid spring motor for moving the arm from a position extending rearwardly from the auto to a position extending sidewardly from and then forwardly alongside of the auto, whereby the motorcycle policeman simulatedy trails and then overtakes and comes alongside the auto, said means including speed reducing gearing connecting the motor to a vertical shaft about which the arm is freely oscillatable, and a lost-motion device mounted on said shaft and adapted to engage and push the arm from the rearward to the sideward and forward position, said lost-motion device providing a period during which the motorcycle policeman trails the auto at a uniform spaced distance therefrom as though clocking the speed of the auto.

18. A pursuit toy comprising a first vehicle, a motor in said vehicle for propelling the same, an arm pivotally mounted at the rear end of the vehicle, a simulated pursuit vehicle pivotally mounted on the remote end of said arm, means driven by the aforesaid motor for moving the arm from a position extending rearwardly from the first vehicle to a position extending sidewardly from and then forwardly alongside of the vehicle, whereby the pursuit vehicle simulatedly trails and then overtakes and comes alongside the pursuit vehicle, and means for bringing the pursued vehicle to a stop when the pursuit vehicle has moved from behind to a position alongside the pursued vehicle.

19. An auto and motorcycle policeman comprising a first vehicle simulating an auto, a motor in said auto for propelling the same, an arm pivotally mounted at the rear end of the auto, a simulated motorcycle and policeman pivotally mounted on the remote end of said arm, whereby said motorcycle policeman is moved by the auto, means for moving the arm from a position extending rearwardly from the auto to a position extending sidewardly from and then forwardly alongside of the auto, whereby the motorcycle policeman simulatedly trails and then overtakes and comes alongside the auto, and means for bringing the auto to a stop when the motorcycle has moved from behind to a position alongside the auto.

20. An auto and motorcycle policeman toy comprising a first vehicle simulating an auto, a motor in said auto geared to the wheels of the auto for propelling the same, an arm pivotally mounted at the rear end of the auto, a simulated motorcycle and policeman pivotally mounted on the remote end of said arm, whereby said motorcycle policeman is moved by the auto, means driven by the aforesaid spring motor for moving the arm from a position extending rearwardly from the auto to a position extending sidewardly from and then forwardly alongside of the auto, whereby the motorcycle policeman simulatedly trails and then overtakes and comes alongside the auto, and means controlled by the arm for bringing the auto to a stop when the motorcycle has moved to a position alongside the auto.

21. An auto and motorcycle policeman toy comprising a first vehicle simulating an auto, a spring motor in said auto geared to the wheels of the auto for propelling the same, an arm pivotally mounted at the rear end of the auto, a simulated motorcycle and policeman pivotally mounted on the remote end of said arm, whereby said motorcycle policeman is moved by the auto, means driven by the aforesaid spring motor for moving the arm from a position extending rearwardly from the auto to a position extending sidewardly from and then forwardly alongside of the auto, whereby the motorcycle policeman simulatedly trails and then overtakes and comes alongside the auto, the arm being so shaped and mounted as to come into braking engagement with one of the rear wheels of the auto when the motorcycle comes alongside the auto, thus bringing the auto to a stop.

22. A toy assembly comprising a first wheeled toy simulating a pursued object, a second wheeled toy simulating a pursuing object, motor means for rapidly propelling said toys and for causing the second toy to gain on the first toy, means to guide the second toy in its running position relative to the first toy, and brake means automatically operated by mechanism responsive to the relative positions of the toys to abruptly arrest the toy assembly against continued movement when the second toy reaches the first toy, whereby said toy assembled automatically simulates pursuit and capture of the first toy by the second toy, without the intervention of an operator during the operating cycle.

23. A toy assembly comprising a first wheeled toy simulating a speeding auto, a second wheeled toy simulating a police motorcycle, a motor driven means for propelling said toys and for causing the motorcycle toy to gain on the auto toy, and brake means automatically operated by mechanism responsive to the relative positions of the toys acting on the auto toy to arrest it against continued movement when the motorcycle toy reaches the auto toy, whereby said toy assembly automatically simulates pursuit and capture of the speeding auto by the police motorcycle, without the intervention of an operator during the operating cycle.

RAYMOND JOHN LOHR.